No. 876,551. PATENTED JAN. 14, 1908.
A. HOPPE.
CRATE COVER FOR WAGON BODIES.
APPLICATION FILED APR. 23, 1907.
2 SHEETS—SHEET 1.
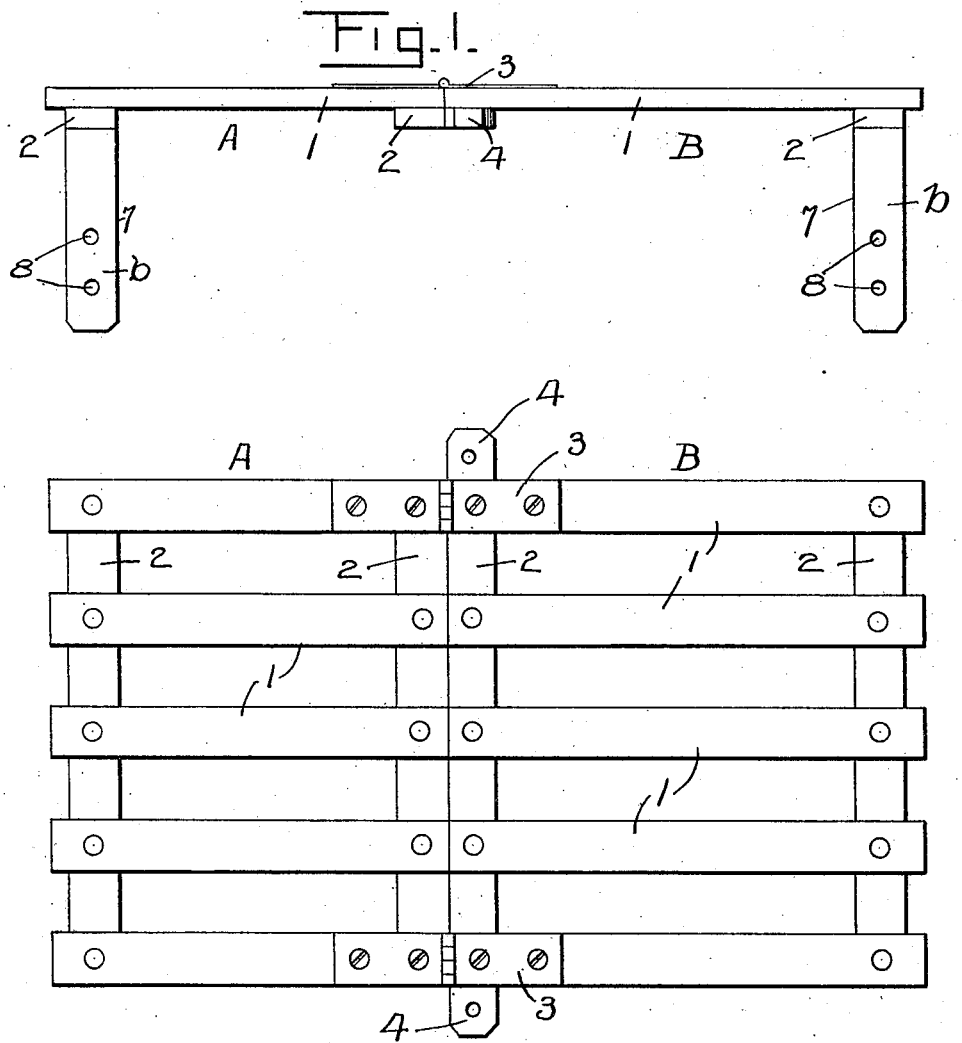

No. 876,551. PATENTED JAN. 14, 1908.
A. HOPPE.
CRATE COVER FOR WAGON BODIES.
APPLICATION FILED APR. 23, 1907.
2 SHEETS—SHEET 2.
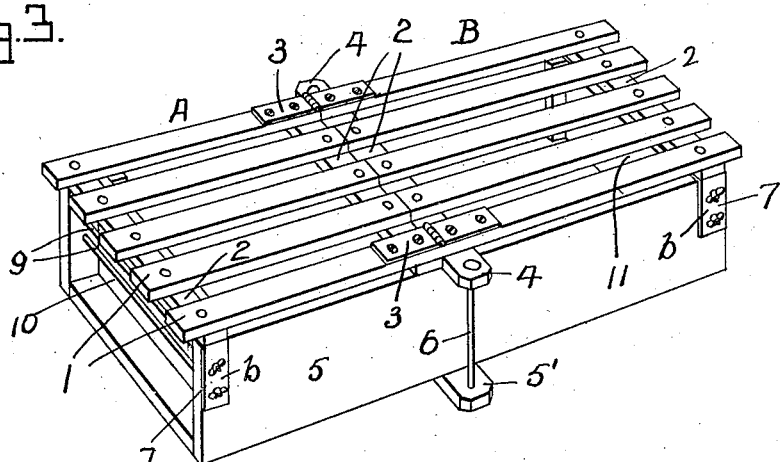
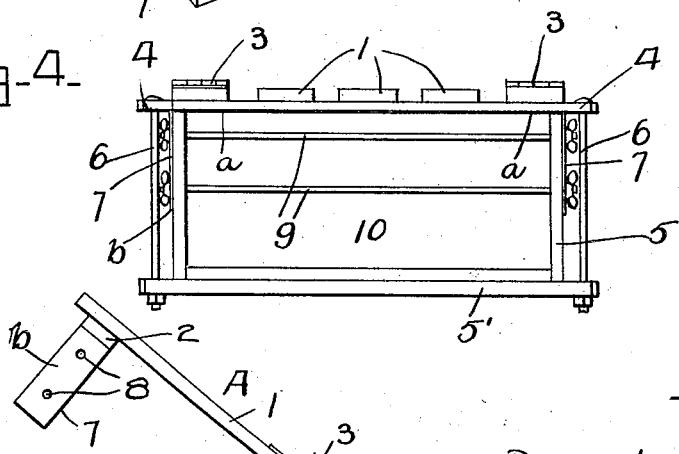
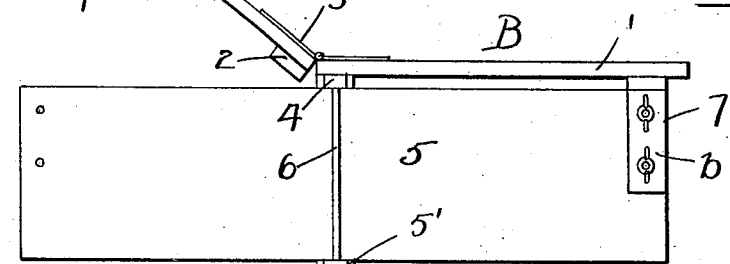
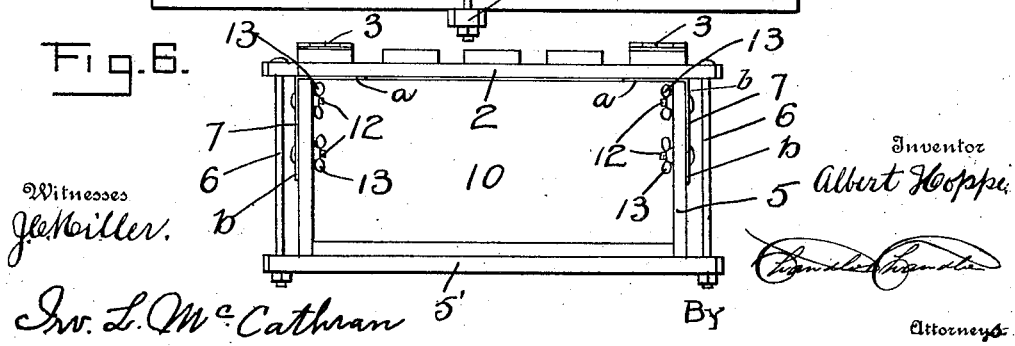

UNITED STATES PATENT OFFICE.

ALBERT HOPPE, OF LEAVENWORTH, KANSAS.

CRATE-COVER FOR WAGON-BODIES.

No. 876,551.  Specification of Letters Patent.  Patented Jan. 14, 1908.

Application filed April 23, 1907. Serial No. 369,747.

*To all whom it may concern:*

Be it known that I, ALBERT HOPPE, a citizen of the United States, residing at Leavenworth, in the county of Leavenworth, State of Kansas, have invented certain new and useful Improvements in Crate-Covers for Wagon-Bodies; and I do hereby declare the following to be a full, clear, and exact description of the invention, such as will enable others skilled in the art to which it appertains to make and use the same.

This invention has relation to crate-covers for wagon beds or boxes, when farmers or others desire to convert the wagon-box into a coop or pen to transport hogs, sheep or fowls to market.

It is the object of the invention to provide a simple and efficient crate-cover that may be easily applied and removed, and be highly serviceable when in use.

The nature of the invention is fully and clearly ascertainable from the device portrayed in the annexed drawings, forming a part of this specification, in view of which it will first be described with respect to its construction and mode of use and then be pointed out in the subjoined claims.

Of the said drawings—Figure 1 is a side elevation of the crate-cover. Fig. 2 is a plan of the same. Fig. 3 is a perspective of the invention applied. Fig. 4 is a rear end view. Fig. 5 is a side elevation showing the rear section as released from the end-gate and swung up to open position. Fig. 6 is an end view showing a slight modification.

Similar numerals of reference designate similar parts or features, as the case may be, wherever they occur.

Having reference to the drawings for an understanding of the improvement in detail, it will be observed that the crate cover is composed of two sections, a front section, B, and a rear section A. The said two sections are composed of longitudinal slats or bars 1 and cross-bars 2, to which latter the bars 1 are secured. The abutting ends of the side-bars 1, are connected by hinges 3, and the inner cross-bar of the front section is extended, as at 4, beyond the side bars 1, and said extensions, which project over the sides of the wagon-bed 5, have holes formed through them for the reception of pins or bolts 6 to secure them to the cross-coupling 5' or other part of the wagon-bed.

7 designates lengths of strap-iron, or similar material bent at substantially their centers to form angle pieces, one arm $a$ of which is secured to the outer end of the end cross-bars 2 and the other arm $b$ extending down vertically, and provided with holes 8 through which a rod or rods 9 outside of the end-gates 10 and 11 extend. Thus, the crate is provided at each corner with an angle-piece, as described.

In case the end gates are not provided with rods, as mentioned, bolts 12 may be inserted through holes in the sides of the wagon bed from the outside and projected through the holes 8 in the arms $b$ of the angle pieces, thumb nuts, 13 being turned on the inner ends of the bolts to hold the crate down in place. (See Fig. 6.) I mention thumb nuts merely because of the readiness with which they may be turned on or off. Any other form of nuts would answer as well.

The front section B of the crate cover may be considered as secured permanently in place for the time being, the rear end of the rear section A, being released from the bolts or rods and swung upward, as shown in Fig. 5, when it is desired to gain access to the poultry or stock in the crate-covered bed, or for loading the same therein.

There may be as many longitudinal bars and cross bars, as may be desired or necessary, and the size of the crate-cover will be such as to suit it to the size of the wagon-bed.

What is claimed is—

A crate cover for wagon-beds consisting of two sections, front and rear, hingedly connected, and composed of longitudinal and transverse bars, said crate-cover being provided at its corners with metallic angle pieces, one arm of each of which is secured to the cover and the other arm extending down and provided with holes for the reception of means to secure the crate cover to the wagon-bed, the inner cross-bar of the front section being extended, extended portions being provided with holes to adapt them to be secured to the wagon-bed.

In testimony whereof, I affix my signature, in presence of two witnesses.

ALBERT HOPPE.

Witnesses:
 J. H. JEFFRIES,
 M. E. NAYLON.